(12) United States Patent
Pielok

(10) Patent No.: US 6,369,686 B1
(45) Date of Patent: Apr. 9, 2002

(54) RESOLVER FOR GENERATING SIGNALS WITH REDUCED HARMONICS PORTIONS

(75) Inventor: Gerhard Pielok, München (DE)

(73) Assignee: LTN Servotechnik GmbH, Unterföhring (DE)

( * ) Notice: Subject to any disclaimer, the term of this patent is extended or adjusted under 35 U.S.C. 154(b) by 0 days.

(21) Appl. No.: 09/254,195

(22) PCT Filed: Aug. 14, 1997

(86) PCT No.: PCT/EP97/04455

§ 371 Date: Jan. 4, 2000

§ 102(e) Date: Jan. 4, 2000

(87) PCT Pub. No.: WO98/09367

PCT Pub. Date: Mar. 5, 1998

(30) Foreign Application Priority Data

Aug. 29, 1996 (DE) .......................................... 196 35 040

(51) Int. Cl.$^7$ .............................................. H01F 27/24
(52) U.S. Cl. ...................................... 336/234; 310/254
(58) Field of Search ................................ 310/216, 217, 310/254, 259, 261; 336/212, 234

(56) References Cited

U.S. PATENT DOCUMENTS

| | | |
|---|---|---|
| 3,030,595 A | 4/1962 | Campbell et al. |
| 4,616,151 A | * 10/1986 | Pryjmak ..................... 310/216 |
| 5,086,245 A | * 2/1992 | Sieja et al. .................. 310/216 |
| 5,636,432 A | 6/1997 | Usher et al. |
| 5,640,064 A | 6/1997 | Boyd, Jr. et al. |
| 5,668,429 A | 9/1997 | Boyd, Jr. et al. |

FOREIGN PATENT DOCUMENTS

DE   44 36 898   4/1995
SU   1 737 650   5/1992

OTHER PUBLICATIONS

Patent Abstracts of Japan, vol. 10, No. 137 (E–405), published May 21, 1986 regarding JP 61 001235, published Jan. 1, 1986.
Patent Abstracts of Japan, vol. 12, No. 124 (E–601), published Apr. 16, 1988 regarding JP 62 250850 A., published Oct. 31, 1987.
Loge, H., "New Hollow–Shaft Resolvers For Servo Applications," Siemens Components XXVIII, No. 3, May/Jun., 1992, pp. 19–21.
WPI/Derwent Abstracts, XP 002048571, published 1993, regarding SU 1 737 650, published May 30, 1992.

* cited by examiner

Primary Examiner—Lincoln Donovan
Assistant Examiner—Taylor Nguyen
(74) Attorney, Agent, or Firm—Brinks Hofer Gilson & Lione

(57) ABSTRACT

A resolver having a first winding core with a first set of core plates that are laminated to each other and that have a plurality of winding spaces with winding openings that are larger than the diameter. A primary winding wire wound on the first winding core, wherein the winding openings of the first set of core plates are larger in diameter than the diameter of the primary winding wire. A second winding core comprising a second set of core plates that are laminated to each other and that have a plurality of winding spaces with winding openings. A secondary winding wire wound on the second winding core, wherein the winding openings of the second set of core plates are larger in diameter than the diameter of the secondary winding wire. The first set of core plates are rotated with respect to each other in such a way that the remaining total winding opening of the first winding core is less than the diameter of the primary winding wire.

10 Claims, 5 Drawing Sheets

RESOLVER FOR GENERATING SIGNALS WITH REDUCED HARMONICS PORTIONS

BACKGROUND OF THE INVENTION

Field of the Invention

The invention relates to a resolver, for example resolvers or synchro devices, with a primary winding and a secondary winding, each of which are wound on a winding core comprising several core plates laminated to each other, wherein the core plates each have several winding spaces with winding openings which are larger than the diameter of the winding wire used. 2. Description of the Related Art Such a resolver is known from the article by Hans Logé "Hohlwellendrehmeter: neue Komponenten der Servotechnik" [Hollow Shaft Resolvers: Novel Components of servo Technology] in the German Magazine Siemens Components 30 (1992), issue 2, pp. 57 to 60.

In principle, such a resolver is a rotating transformer, whose output voltage has a clear correlation with the position of its shaft. Therefore resolvers are suitable as absolute angle sensors with a range of rotation of 360°.

The structure of such a resolver is shown in a sectional representation in FIG. 2. The rotor 1 has a primary winding wire 2 and the stator 4 a secondary winding wire 5: these constitute the transformer. The primary winding wire 2, and secondary winding wire 5, are wound on core plate package 3, and core plate package 6, whose relative arrangement with respect to each other is shown in a front view in FIG. 3. Here, winding openings 8 with winding spaces 7 for the primary winding wire 2 are arranged on the core plate package 3 of the rotor 1 in the outer core plate area, and winding openings 10 with secondary winding spaces 9 for the winding wire sore arranged in the inner core plate area on the core plate package 6 of the stator 4.

Such winding openings with winding spaces for the winding wire are evenly arranged on the outer, or respectively inner circumference of the respective core plate package.

As shown in FIGS. 4a–c individual core plates are glued together into a core plate package in such a way, that the total winding opening of a core plate package resulting from a superimposition of the winding openings is provided straight or obliquely. Thus, the individual core plates are exactly aligned in the same position one above the other, or slightly rotated in respect to each other. In this case it is necessary to take care that a problem-free insertion of the winding wire into the winding spaces through the remaining total winding opening is still possible. If the winding cores for the rotor 1 and the stator 4 are laminated in this way to form a core plate package from several core plates, the winding wire is placed into the winding spaces exclusively by an automated device. A view of the core plates, which have been placed exactly on top of each other and laminated, of the core plate package 3 of the rotor 1 with resulting total winding openings 11 is represented in FIG. 4b. A core plate package 3 of the rotor 1 with core plates, which are slightly rotated in respect to each other, and oblique total winding openings 12 resulting therefrom, are represented in FIG. 4c. The rotation of the individual core plates of a core plate package can only take place to the extent that the total winding openings 12 still allow the problem-free insertion of the winding wire into the winding spaces. It follows from this that, for a greater rotation of the individual core plates in relation to each other, respectively larger winding openings must be provided in the individual core plates. This is not desirable because of the unfavorable properties of the winding openings, Therefore such resolvers must be designed as a compromise between the rotation of the individual core plates in relation to each other and the total winding openings.

Parameters important for determining the quality of such a resolver are the number of the winding openings and winding spaces in the core plate package of the stator 4 and the rotor 1, and the width of the total winding openings predetermined by the diameter of the winding wire.

The quality of a resolver is determined by the angular deviations and the harmonic portions of the signals generated by it. The smallest possible angular deviations as well as the least amount of harmonic portions are desired.

The angular deviation and the harmonic portions of a resolver constructed in accordance with FIG. 4b, which has 24 winding openings 10 and winding spaces 9 in the core plate package of the stator, 4 and 20 winding openings 8 and winding spaces 7 in the one of the rotor 1 (a so-called 24/20 resolver), is represented in FIG. 5a. As in FIGS. 5b to 5d for other configurations, here the angular deviation along with the twisting angle of the rotor 1 in relation to the stator 4 is represented on the X axis in the left part, and the measured deviation on the Y axis, It can be seen that a maximum deviation of approximately 12.5° exists. On the right side of this drawing figure the harmonic portions with the number of the harmonic are entered on the X axis, and its amplitude on the Y axis. It can be seen that the harmonic portions are only present in a very attenuated way. Here, maximum amplitudes are clearly below 10 dB.

Since it is desired to produce resolvers of smaller size, the previously mentioned 24/20 configuration of a resolver is not always possible, since not enough space is provided in the winding core for the 24, or winding openings 8 and winding spaces 7 of the primary winding wire 2, or the 20 winding openings 10 and windings spaces 9 of the secondary winding wire 5. The following remarks, as well as the following description of an exemplary embodiment in accordance with the invention relate to a 16/12 resolver, i.e. a resolver with 16 winding openings 10 and winding spaces 9 in the core plate package of the stator 4 and 12 winding openings 8 with winding spaces in the one of the rotor 1.

The angular deviation and the harmonic portions of such a resolver, whose core plates have been arranged in a core plate package as represented by way of example in FIG. 4b, are represented in FIG. 5b. It can be seen that with a reduced angular deviation a strong peak occurs in the 48th harmonic, whose amplitude clearly lies above 20 dB. Based on these results it is; possible to conclude that a dependable evaluation of the angle is; not possible.

To reduce the amplitudes of the higher harmonics, in particular of the 48th harmonic, it is known to slightly turn the individual core plates of a core plate package in relation to each other prior to lamination, such as is shown by way of example in FIG. 4c for the core plate package for a rotor winding. The angular deviation, along with the associated harmonic portion, represented in FIG. 5c resulted for such a core plate package. It can be clearly seen that the angular deviation lies at peaks above. 15°, but the amplitude of the 48th harmonic only between 12.5 and 15 dB. However, the harmonics approximately starting at the 80th harmonic are clearly stronger than in the previously described embodiments. In connection with the rotation of the individual core plates in respect to each other before they are laminated into a core plate package, it is necessary to take into consideration that the winding opening 12 of the core extending over all core plates is greater than the diameter of the winding wire used, so that the latter can be placed without problems through a respective total winding opening 12 into the respective winding space. The limits of the possible rotation of the individual core plates in respect to each other result from this.

An object and advantage of the present invention is therefore based on generating the magnetic flux of a resolver with reduced fluctuations and in this way to obtain a resolver, whose signals are low in harmonics.

SUMMARY OF THE INVENTION

In accordance with the invention, this object and advantages are attained by means of a resolver having a primary winding and a secondary winding, which respectively are wound on a winding core comprising of several core plates laminated to each other, wherein the core plates respectively have several winding spaces with winding openings which are larger than the diameter of the winding wire used and which is distinguished in that the individual core plates, which are laminated to each other, for the core of the primary winding and/or the secondary winding are rotated in respect to each other in such a way that the remaining total winding opening of the respective core is less than the diameter of the winding wire used.

The object and advantage are further attained by means of a resolver having a primary winding wire and a secondary winding wire, which respectively are wound on a winding core comprising of several core plates laminated to each other, wherein the core plates respectively have several winding spaces with winding openings which are larger than the diameter of the winding wire used and which is distinguished in that a respective total winding opening of a core plate package comprising of several core plates for the core of the primary winding wire and/or the secondary winding wire is rotated in relation to a respective total winding opening of a further core plate package for the respective core, so that the remaining respective total winding opening of the respective core is less than the diameter of the winding wire used.

Such a primary winding wire or secondary winding wire is produced in accordance with a method of the invention which is distinguished in that in the winding process the core of the respective winding comprising of at least two core plate packages which are aligned in such a way that an automatic winding process can be performed through the respective winding openings;

in the winding process the respective core plate packages are kept apart by means of a spacer;

the respective spacer is removed after the winding process: and the core plate packages, which can now be loosely rotated in relation to each other and are subsequently laminated to each other in such a way that a remaining respectively total winding opening of the respective core is less than the diameter of the winding wire used.

Because of the winding in accordance with the invention of the primary and/or secondary windings on core plates or partial packages which are at a distance from each other, the core plates or partial packages are placed loosely in respect to each other after the winding process and the removal of the spacer(s). They are only supported by the wire winding lying in the winding spaces. At this stage there is not yet a finished winding core comprising of a core plate package. Before they are laminated to each other, it is now possible to rotate the individual core plates or partial packages, which are still loosely placed in respect to each other, in relation to each other, depending on the distance between the individual core plates or partial packages in relation to each other which was selected prior to winding. Such a rotation is no longer dependent on the diameter of the winding wire, therefore the individual core plates or partial packages can also be rotated in respect to each other to such an extent, that a total winding opening extending through all core plates no longer exists. At this stage it is no longer needed, since the winding process has already been terminated.

By means of winding cores constructed in this way it is possible for the winding opening to overlap to such an extent, that a fluctuation-reduced magnetic flux is achieved without having to forego an efficient winding method by machine. Furthermore, a signal generation with clearly reduced harmonics is created by this. Besides the possible overlapping of the winding openings, this fluctuation-reduced magnetic flux and the signal generation with reduced harmonics are further based on the fact that the winding openings of the individual core plates can be reduced almost down to the thickness of the winding wire. In this way it also becomes possible to make do with a reduced number of winding spaces at the circumference of the core plates.

Furthermore, simpler stamping tools can be used for producing the core plates, and the number of core plates can be reduced.

The invention and advantageous details will be explained in greater detail in what follows by means of an exemplary embodiment, making reference to the drawings. Shown are in:

DESCRIPTION OF THE PREFERRED EMBODIMENT(S)

Figure 1A:
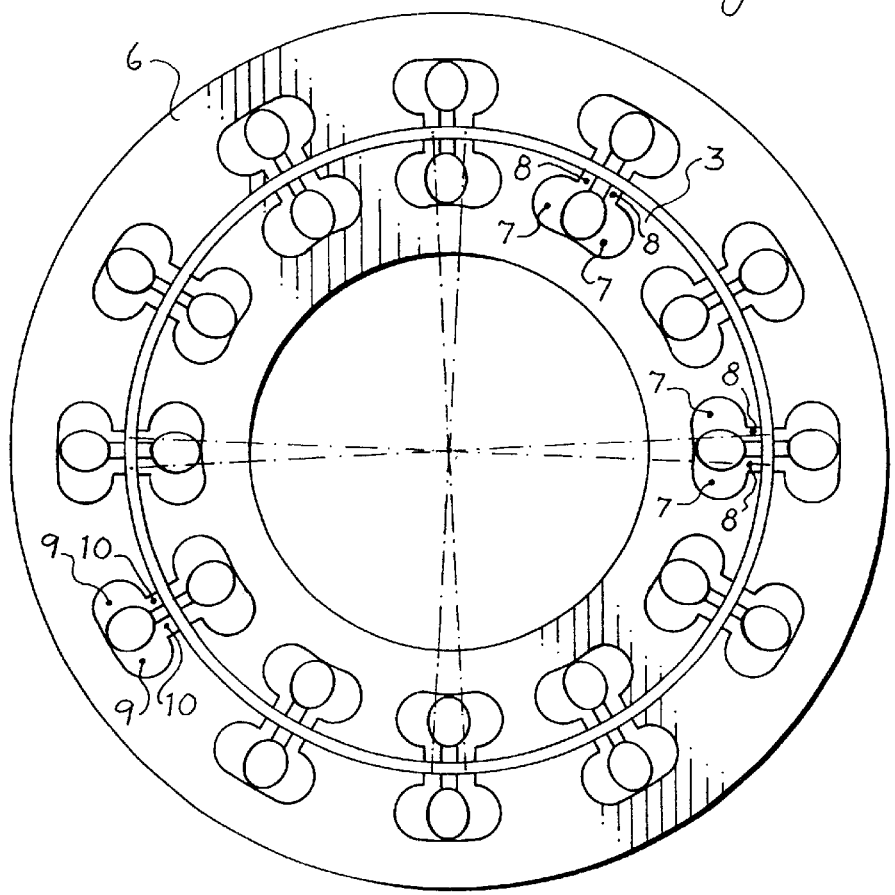
FIG. 1 shows a front view an embodiment in accordance with the present invention of a core plate package for the rotor of a resolver, such as can become available after the winding process.
Figure 1B:
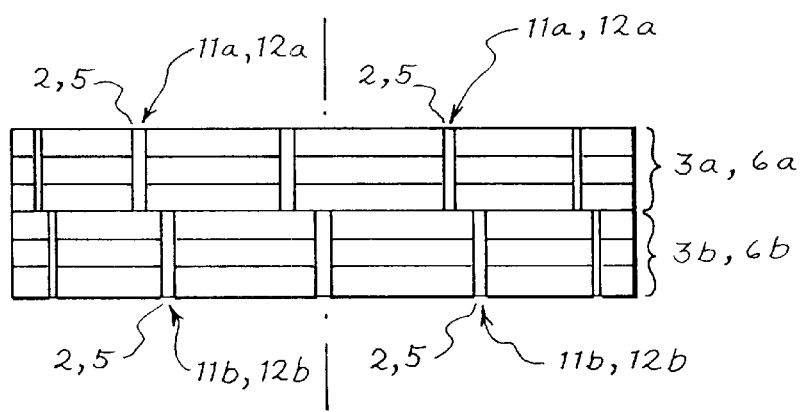
Figure 2:
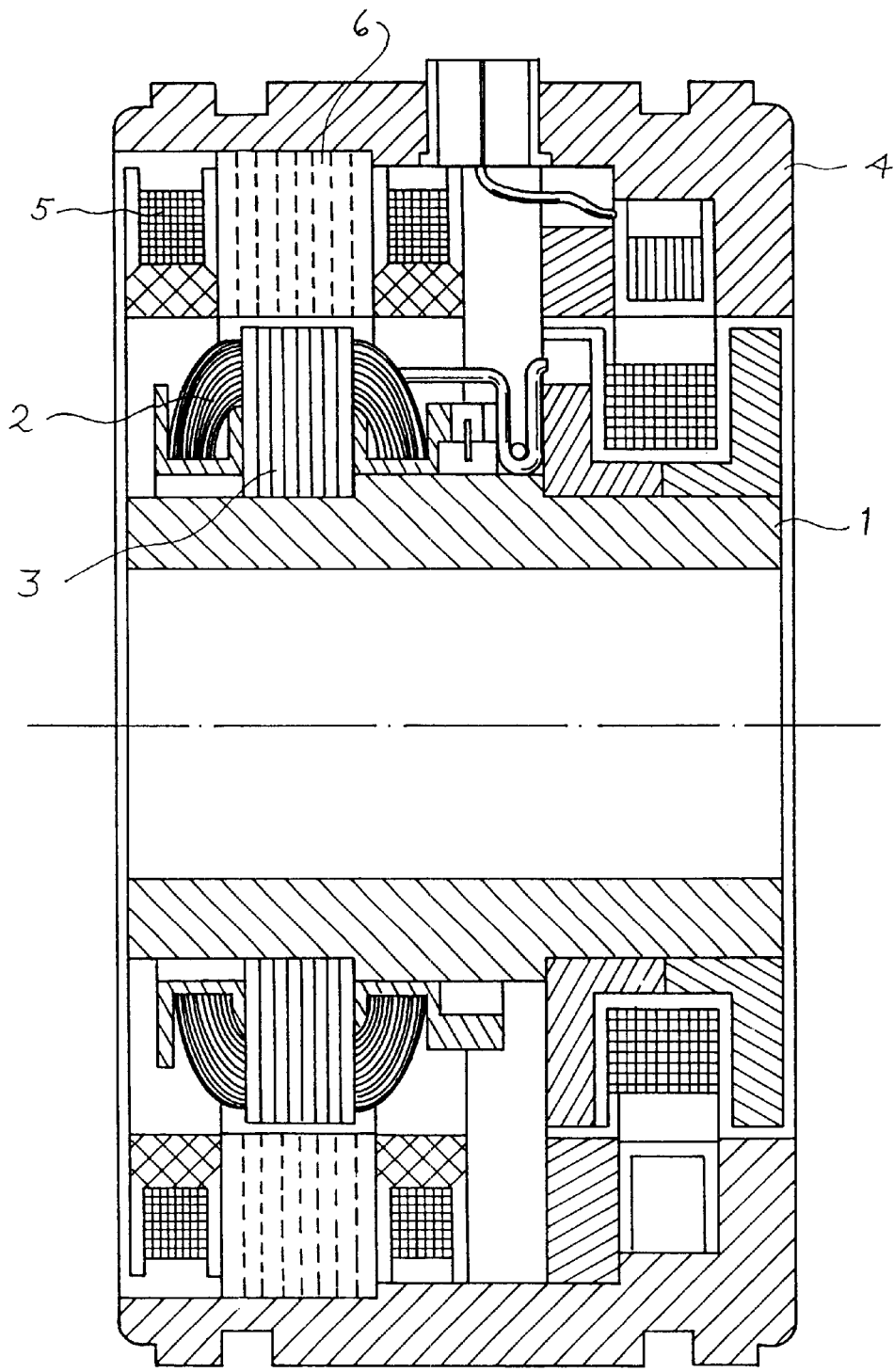
FIG. 2 shows a sectional representation of the structure of a prior art resolver.
Figure 4A:
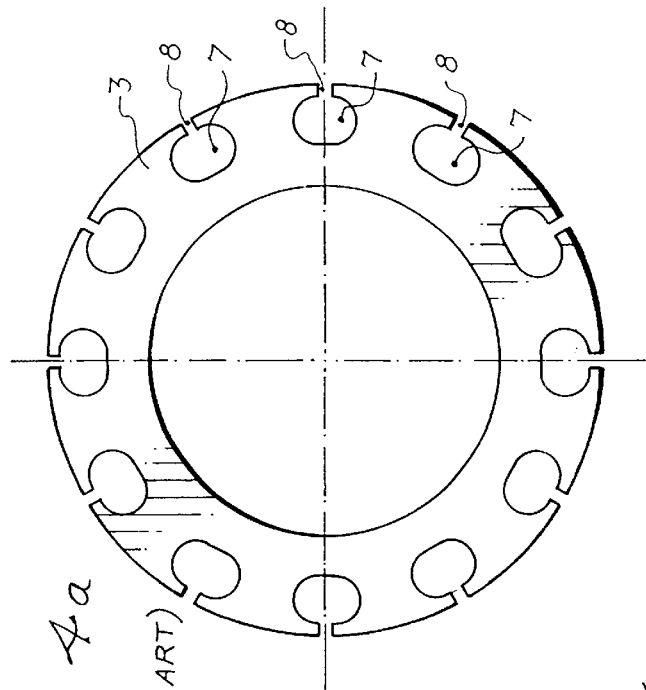
FIGS. 4a shows 4b and 4c, the front view of a prior art rotor core plate package and lateral views of the rotor core plate package laminated together from several core plates, wherein the individual core plates are exactly aligned on top of each other and are slightly displaced in respect to each other.
Figure 4B:
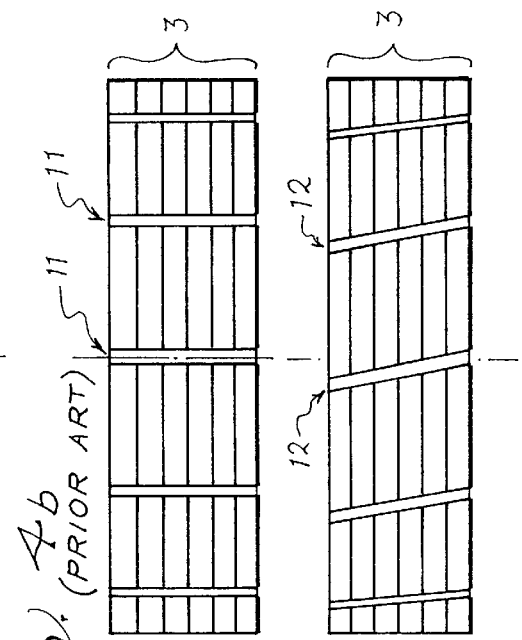
Figure 4C:
Figure 3:
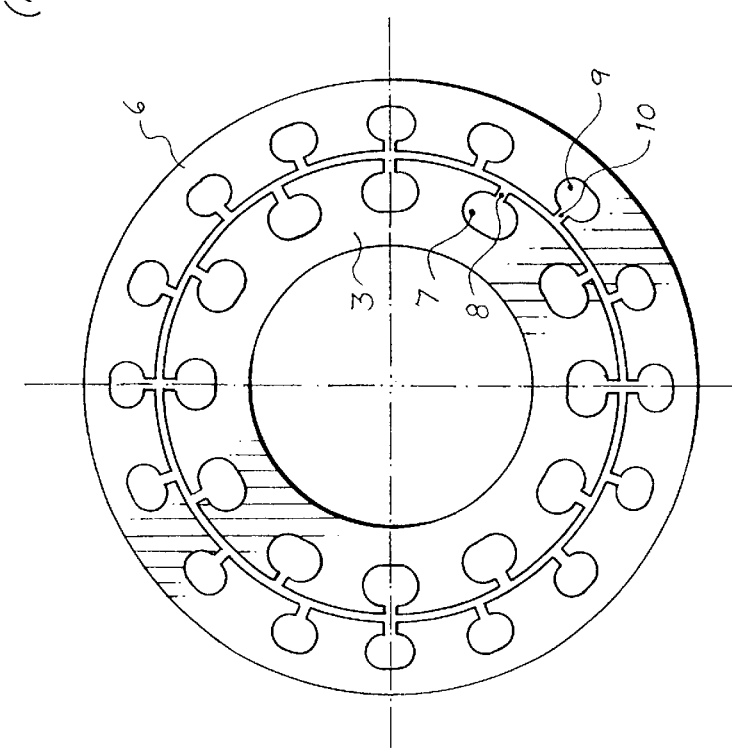
FIG. 3 shows a front view of a prior art rotor core plate package and of a stator core plate package.

A rotor core plate package of the resolver in accordance with the present invention is represented by way of example in FIG. 1. The core plate package 3 here comprises of two partial packages 3a and 3b, each of which has total winding openings 11a and 11b, which are only slightly larger than the diameter of the winding wire. During the winding process these two partial packages are kept apart from each other by a spacer and are aligned in such a way that it is not necessary to do without an efficient winding method by machine, After the winding process has been terminated, the two partial packages 3a and 3b and the spacer are held by the wire winding 2. When the spacer between the partial packages 3a and 3b is removed, they are placed loosely in relation to each other, while they continue to be held by the wire winding 2. Depending on the distance selected, the respective total winding openings 11a and 11b of the two partial packages 3a and 3b can be rotated in such a way that a respective winding opening of the core, which extends over all core plates, is smaller than the diameter of the winding wire used, or does not exist at all. The wider the existing distance between the partial packages 3a and 3b during the winding process, the further they can be rotated in respect to each other.

The maximally obtainable angle of rotation between the partial packages 3a and 3b is determined by their distance from each other that was set during the winding process by the spacer.

This rotation of the core plate packages in relation to each other takes place during the laminating process by which the two core plate packages are glued to each other. A continuous core 3 is created in this way, which need not have total winding openings dependent on the size of the diameter of the winding wire.

Figure 5A:
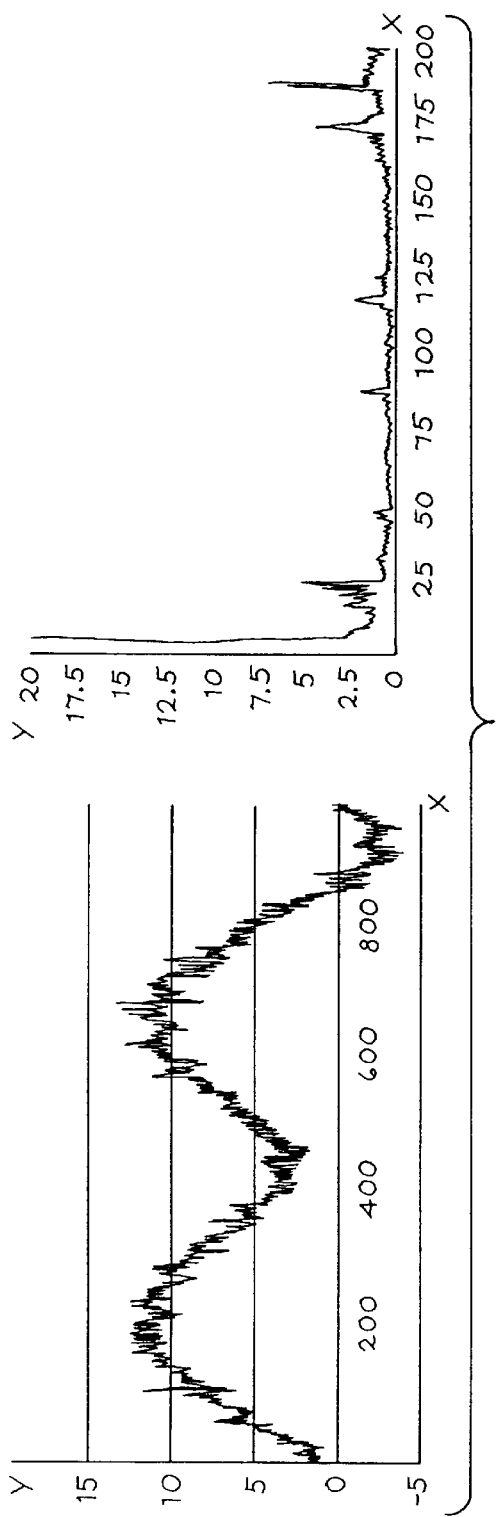
FIG. 5a shows the angular deviation of a 24/20 resolver and its harmonic portions.
Figure 5B:
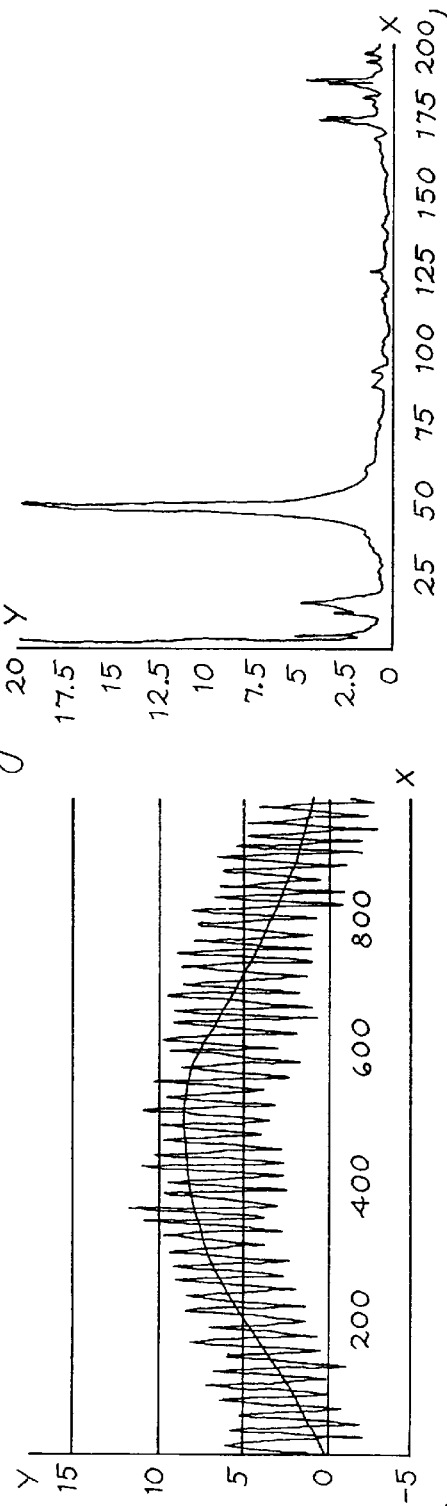
FIG. 5b shows the angular deviation of a 16/12 resolver with core plates exactly placed on top of each other, and its harmonic portions.
Figure 5C:
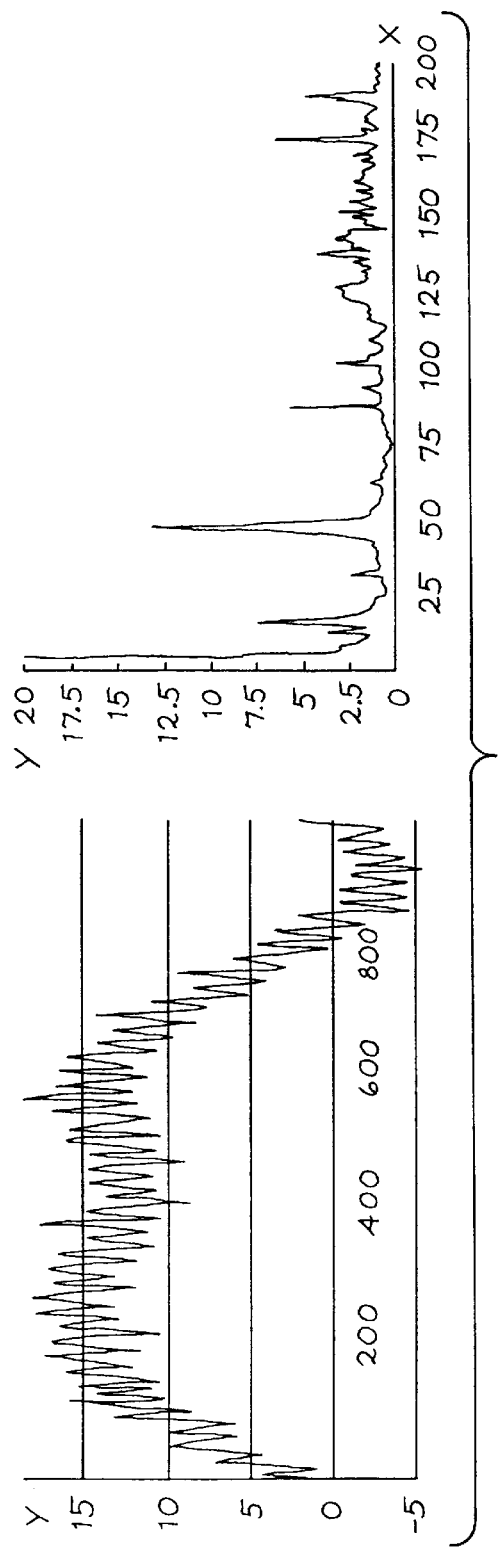
FIG. 5c shows the angular deviation of a 16/12 resolver with core plates which are rotated in relation to each other, and its harmonic portions.
Figure 5D:
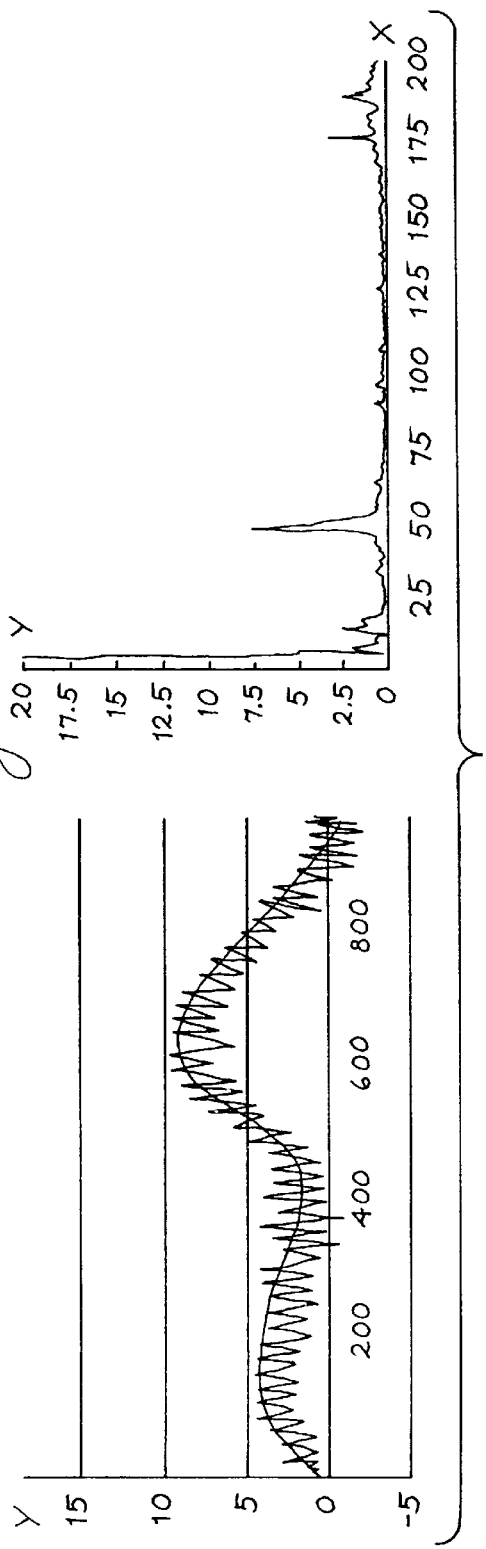
FIG. 5d shows the angular deviation of a 16/12 resolver in accordance with the invention and its harmonic portions.

The angular deviation and the harmonic portions of a resolver constructed in this way in accordance with the invention are represented in FIG. 5d. It is possible to clearly see that 10° are not exceeded in the angular deviation and that the amplitudes of the harmonic portions are greatly reduced, wherein amplitude of the 48th harmonic additionally lies clearly below 10 dB.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A resolver comprising:
   a first winding core comprising a first set of core plates that are laminated to each other and that have a plurality of winding spaces with winding openings;
   a primary winding wire wound on the first winding core, wherein the winding openings of the first set of core plates are larger in diameter than the diameter of the primary winding wire;
   a second winding core comprising a second set of core plates that are laminated to each other and that have a plurality of winding spaces with winding openings;
   a secondary winding wire wound on the second winding core, wherein the winding openings of the second set of core plates are larger in diameter than the diameter of the secondary winding wire;
      wherein the first set of core plates are rotated with respect to each other in such a way that the remaining total winding opening of the first winding core is less than the diameter of the primary winding wire.

2. The resolver of claim 1, wherein the second set of core plates are rotated with respect to each other in such a way that the remaining total winding opening of the second winding core is less than the diameter of the secondary winding wire.

3. The resolver of claim 1, wherein the second set of core plates are rotated with respect to each other in such a way that the remaining total winding opening of the second winding core does not exist at all.

4. A resolver comprising:
   a first winding core comprising a first set of core plates that are laminated to each other and that have a plurality of winding spaces with winding openings;
   a primary winding wire wound on the first winding core, wherein the winding openings of the first set of core plates are larger in diameter than the diameter of the primary winding wire;
   a second winding core comprising a second set of core plates that are laminated to each other and that have a plurality of winding spaces with winding openings;
   a secondary winding wire wound on the second winding core, wherein the winding openings of the second set of core plates are larger in diameter than the diameter of the secondary winding wire;
      wherein the second set of core plates are rotated with respect to each other in such a way that the remaining total winding opening of the second winding core has a diameter that is less than the diameter of the secondary winding wire.

5. The resolver of claim 4, wherein the first set of core plates are rotated with respect to each other in such a way that the remaining total winding opening of the first winding core is less than the diameter of the primary winding wire.

6. The resolver of claim 4, wherein the second set of core plates are rotated with respect to each other in such a way that the remaining total winding opening of the second winding core does not exist at all.

7. A resolver comprising:
   a winding core comprising core plates that are laminated to each other and that have a plurality of winding spaces with winding openings, wherein the winding core comprises at least a first core plate package with winding openings and a second core plate package with winding openings;
   a winding wire wound on the winding core, wherein the winding openings of the first core plate package are larger in diameter than the diameter of the winding wire and wherein the winding openings of the second core plate package are also larger than the diameter of the winding wire; and
      wherein the first core plate package is rotated with respect to the second core plate package in such a way that the remaining total winding opening of the winding core is less than the diameter of the winding wire.

8. A resolver comprising:
   a winding core comprising core plates that are laminated to each other and that have a plurality of winding spaces with winding openings, wherein the winding core comprises at least a first core plate package with winding openings and a second core plate package with winding openings;
   a winding wire wound on the winding core, wherein the winding openings of the first core plate package a re larger in diameter than the diameter of the winding wire and wherein the winding openings of the second core plate package are also larger than the diameter of the winding wire; and
      wherein the first core plate package is rotated with respect to the second core plate package in such a way that there is an overlaying between the winding openings of the first core plate package and the winding openings of the second core plate package that is less than the diameter of the winding wire.

9. A resolver comprising:

a winding core comprising core plates that are laminated to each other and that have a plurality of winding spaces with winding openings, wherein the winding core comprises at least a first core plate package with winding openings and a second core plate package with winding openings;

a winding wire wound on the winding core, wherein the winding openings of the first core plate package are larger in diameter than the diameter of the winding wire and wherein the winding openings of the second core plate package are also larger than the diameter of the winding wire; and wherein the first core plate package is rotated with respect to the second core plate package in such a way that there is no overlaying between the winding openings of the first core plate package and the winding openings of the second core plate package.

10. A resolver comprising:

a first winding core comprising a first set of core plates that are laminated to each other and that have a plurality of winding spaces with winding openings;

a primary winding wire wound on the first winding core, wherein the winding openings of the first set of core plates are larger in diameter than the diameter of the primary winding wire;

a second winding core comprising a second set of core plates that are laminated to each other and that have a plurality of winding spaces with winding openings;

a secondary winding wire wound on the second winding core, wherein the winding openings of the second set of core plates are larger in diameter than the diameter of the secondary winding wire;

wherein the first set of core plates are rotated with respect to each other in such a way that the remaining total winding opening of the first winding core does not exist at all.

* * * * *